United States Patent

[11] 3,634,195

[72] Inventors Nicholas Melachouris;
Robert Lemoyne Charles, both of Elkhart, Ind.
[21] Appl. No. 856,149
[22] Filed Sept. 8, 1969
[45] Patented Jan. 11, 1972
[73] Assignee Miles Laboratories, Inc.
Elkhart, Ind.

[54] PRODUCTION OF LIPASE
6 Claims, No Drawings

[52] U.S. Cl. .................................................... 195/62, 195/66
[51] Int. Cl. .................................................... C12d 13/06
[50] Field of Search .......................................... 195/66, 62

[56] References Cited
UNITED STATES PATENTS

| | | | |
|---|---|---|---|
| 3,256,157 | 6/1966 | Truant et al. ................ | 195/62 |
| 3,431,175 | 3/1969 | Arima et al. ................. | 195/62 |

*Primary Examiner*—Lionel M. Shapiro
*Attorneys*—Joseph C. Schwalbach, Michael A. Kondzella, Louis E. Davidson and Harry T. Stephenson ABSTRACT: A lipase enzyme which hydrolyzes glycerides of long-chain carboxylic acids in preference to those of short-chain carboxylic acids can be produced by growing under aerobic conditions a culture of a strain of *Absidia* in a medium containing appropriate nutrients and then recovering the enzyme therefrom. An especially useful strain is *Absidia butleri*.

PRODUCTION OF LIPASE

BACKGROUND OF THE INVENTION

Lipases are known enzymes having the capability of catalyzing the hydrolysis of fats, such as glycerides of fatty acids. Generally, these lipases are extracted from various plant sources, such as from castor beans, and from animal sources, such as from the pancreas. These prior art lipases generally have the property of preferentially hydrolyzing glycerides of short-chain carboxylic acids having about 4 to 10 carbon atoms in the acid chain as contrasted to hydrolysis of glycerides of long-chain carboxylic acids having about 14 to 20 carbon atoms in the acid chain.

SUMMARY OF THE INVENTION

In accordance with the present invention, a process is provided for producing a lipase comprising growing under aerobic conditions a culture of a strain of Absidia in a medium containing appropriate nutrients and then recovering the enzyme therefrom. A novel lipase is thus produced which hydrolyzes glycerides of long-chain carboxylic acids in preference to hydrolyzing glycerides of short-chain carboxylic acids.

DESCRIPTION OF THE PREFERRED EMBODIMENTS

In carrying out the process of the present invention a strain of Absidia is grown in a suitable medium. Exemplary useful strains are *Absidia butleri*, *Absidia cylindrospora var. rhizomorpha*, and *Absidia blakesleeana*. The preferred stain is *Absidia butleri*. An especially useful strain of *Absidia butleri* isolated from soil has been deposited with the Northern Utilization Research Branch, Agricultural Research Service of the United States Department of Agriculture, Peoria, Illinois and has been given the identification number NRRL 3521. This culture is available to the public without restriction. While *Absidia butleri* NRRL 3521 is the preferred strain, it is understood that natural and artificial mutants of *Absidia butleri* NRRL 3521 can also be employed. Such mutants can be obtained by well known techniques such as X-ray and ultraviolet irradiation.

The strains useful in the present invention are maintained on agar slants in a well-known manner and can be grown in a medium containing sources of carbohydrates and nitrogen. Preferably the medium also contains inorganic salts. Illustrative carbohydrates are corn starch, corn dextrin, dextrose, lactose, milk solids and the like. Illustrative nitrogen compounds are soy meal, protein containing materials, amino acids, yeast extract, cottonseed flour, meat meal and the like. Illustrative inorganic salts are calcium carbonate, zinc sulfate, monosodium phosphate, disodium phosphate and the like. These carbohydrates, nitrogen sources and inorganic salts are well known in the art. It is preferable that the medium contain ground corn as a source of some of the carbohydrates, nitrogen and inorganic salts. It is also preferable that the medium contain bacterial amylase to aid in liquefaction of the carbohydrates.

The Absidia strain is preferably grown under submerged conditions for about 3 to about 7 days at a temperature of from about 25° to about 40° C. At temperatures below about 25° C. the yield of desired enzyme is too low to be economically practical, while at temperatures above about 40° C. the desired enzyme becomes inactivated. The preferred growth temperature is from about 32+ to about 37° C. The growth medium should also preferably have a pH of from about 4.8 to about 8.2.

The desired lipase enzyme of the present invention is present in the beer outside the mycelium and can be recovered in the liquid form by simply filtering off the mycelium from the fermentation beer and retaining the filtrate. The enzyme can be recovered in a powdered form, if desired, by well-known enzyme recovery techniques. The filtrate can be frozen and dried from the frozen state using known freeze-drying techniques. The fermentation beer filtrate could alternatively be treated with ethanol to precipitate the enzyme. The precipitated enzyme is then washed with ethanol and vacuum dried at room temperature. Acetone or other organic solvents, as well as ammonium sulfate, can also be used to precipitate the enzyme from an aqueous solution.

The lipase enzyme produced by the present process is assayed for lipolytic activity by the following method.

LIPASE ACTIVITY

A reaction mixture is prepared by blending 5 ml. of a 10 weight percent emulsion of a carboxylic acid glyceride in 10 weight percent aqueous solution of gum arabic, 2 ml. of a 0.001 M aqueous solution of tris(hydroxymethyl)aminomethane-HCl buffer at pH 8.0, 2 ml. of 3.0 M aqueous sodium chloride solution, 1 ml. of 0.03 M aqueous calcium chloride solution and 5 ml. distilled water. The above total reaction mixture is adjusted to pH 8.0 and placed in the reaction well of an instrument which is capable of adding sufficient quantities of 0.02 N aqueous sodium hydroxide to maintain the pH of the reaction mixture at 8.0. The enzyme to be assayed, if a powder, is dissolved in 0.001 M aqueous solution of tris-(hydroxymethyl)aminomethane-HCl buffer at pH 8.0. If a liquid enzyme is to be assayed, it is adjusted to pH 8.0. A 2 ml. portion of the liquid enzyme sample is added to the above reaction mixture and the reaction mixture-enzyme blend is maintained at 35° C. for 3–4 minutes. During this time the pH of the total blend is maintained at 8.0. The total elapsed time in seconds and the total amount of 0.02 N aqueous sodium hydroxide added to maintain pH 8.0 are measured. The lipase activity is then calculated as follows:

Lipase Units = $V \times 1,200/T$ wherein:
V = Volume of sodium hydroxide (ml.)
T = Time (sec.)

The enzyme activity is then expressed in Lipase Units (LU) per ml. of liquid sample or per mg. of dried sample. A Lipase Unit is defined as the amount of enzyme required to produce one micromole of carboxylic acid per min. under the conditions specified. The sodium hydroxide added to maintain pH neutralizes the carboxylic acid produced and is a measure of such carboxylic acid production. Lipase activity toward short-chain carboxylic acid glycerides is measured using tributyrin as the substrate. It contains four carbon atoms in its carboxylic acid chain. Lipase activity toward long chain carboxylic acid glycerides is measured using butteroil (about 14 to 20 carbon atoms in its major carboxylic acid chain constituents) and olive oil (about 18 carbon atoms in its major carboxylic acid chain constituent).

The present invention will be further described in the following illustrative examples.

EXAMPLE 1

A culture of *Absidia butleri* NRRL 3521 was transferred to several 1-liter Erlenmeyer flasks each containing a sterilized medium consisting of 3.2 g. dextrose monohydrate, 5.0 g. ground corn, 2.9 g. of an amino acid mixture marketed under the trade name Peptone TW, 502 mg. monosodium phosphate, 824 mg. disodium phosphate, 40 mg. bacterial amylase and 100 ml. water. The pH of this medium was 6.4. The inoculated flask contents were then shaken on a reciprocal motion shaker with a 2-inch stroke at 228 strokes per min. for 6 days while maintained at a temperature of 33° C. The resulting fermentation beer was then filtered from the mycelium, the combined filtrate from all flasks was freeze dried and assayed for lipase activity using several substrates. The lipase activity is shown in table 1 below. The lipase activity of the novel enzyme of the present invention is also compared to the activity of a prior art lipase, steapsin.

TABLE 1

| Enzyme | Lipase Activity (LU/mg.) | | |
|---|---|---|---|
| | Substrate | | |
| | Tributyrin | Butteroil | Olive Oil |

| | | | |
|---|---|---|---|
| A. butleri | 0.316 | 1.213 | 1.266 |
| Steapsin | 6.530 | 2.991 | 1.482 |

It can be seen from the above table that the lipase activity of the lipase produced in accordance with the present invention toward glycerides of long-chain carboxylic acids is about four times that of its activity toward glycerides of short-chain carboxylic acids. In contrast to this the prior art lipase has an activity toward glycerides of short-chain carboxylic acids which is about two to four times that of its activity toward glycerides of long-chain carboxylic acids. This preferential activity of the lipase of the present invention provides improved lipase utility when included in detergent compositions and in medicated creams, for example. cl EXAMPLE 2

A culture of *Absidia butleri* NRRL 3521 was transferred to an aerated fermentor containing a sterilized medium consisting of 100 pounds corn dextrin, 50 pounds soy meal, 25 pounds calcium carbonate, 570 g. dextrose monohydrate, 31.16 g. zinc sulfate monohydrate and 300 gal. water. The pH of this medium was 8.1. The culture was grown at 32° C. for 6 days. The resulting fermentation beer was then filtered from the mycelium and an aliquot portion of the filtrate was freeze-dried and assayed for lipase activity using several substrates. The lipase activity is shown in table 2 below.

TABLE 2

| | Lipase Activity (LU/mg.) | | |
|---|---|---|---|
| | | Substrate | |
| Enzyme | Tributyrin | Butteroil | Olive Oil |
| A. butleri | 0.073 | 0.357 | 0.323 |

EXAMPLE 3

Various other strains of Absidia were placed individually in 1-liter Erlenmeyer flasks each containing a sterilized medium consisting of 3.2 g. dextrose monohydrate, 5.0 g. ground corn, 1.0 g. cottonseed flour, 1.0 g. meat meal, 252 mg. monosodium phosphate, 412 mg. disodium phosphate, 40 mg. bacterial amylase and 100 ml. water. The pH of this medium was 6.45. The inoculated flask contents were then shaken on a reciprocal motion shaker with a 2-inch stroke at 228 strokes per minute for 6 days at a temperature of 33° C. The resulting fermentation beer was then filtered from the mycelium. The lipase activity of the enzymes produced from each culture strain was then assayed using several substrates. The results are shown in table 3 below.

TABLE 3

| | Lipase Activity (LU/ml.) | | |
|---|---|---|---|
| | | Substrate | |
| Enzyme | Tributyrin | Butteroil | Olive Oil |
| A. cylindrospora var. rhizomorpha NRRL 2815 | 0.086 | 0.505 | 0.157 |
| A. blakesleeana NRRL 1305 | 0.378 | 0.437 | 0.516 |

What is claimed is:

1. A process for the production of a lipase comprising growing under aerobic conditions a culture of a strain of Absidia selected from the class consisting of *Absidia butleri*, *Absidia butleri* NRRL 3521 or mutants thereof, *Absidia cylindrospora var. rhizomorpha* and *Absidia blakesleeana* in a medium containing appropriate nutrients and then recovering the lipase therefrom.

2. A process according to claim 1 wherein the strain of Absidia is *Absidia butleri*.

3. A process according to claim 1 wherein the strain of Absidia is *Absidia butleri* NRRL 3521 or mutants thereof.

4. A process according to claim 1 wherein the strain of Absidia is *Absidia cylindrospora var. rhizomorpha*.

5. A process according to claim 1 wherein the strain of Absidia is *Absidia blakesleeana*.

6. A lipase enzyme produced by the process of claim 1 which hydrolyzes glycerides of long chain carboxylic acids in preference to glycerides of short chain carboxylic acids.

* * * * *